US006045485A

United States Patent [19]
Klinger et al.

[11] Patent Number: 6,045,485
[45] Date of Patent: Apr. 4, 2000

[54] CIRCUIT FOR INTERFACING VEHICLE DRIVETRAIN, SERVICE BRAKE, AND POWER TAKE-OFF WITH ENGINE CONTROL

[75] Inventors: Rodney J. Klinger; Brian P. Marshall, both of Fort Wayne, Ind.

[73] Assignee: Navistar International Transportation Corp., Chicago, Ill.

[21] Appl. No.: 09/124,598

[22] Filed: Jul. 29, 1998

[51] Int. Cl.[7] .................... B60K 41/20; B60K 41/28

[52] U.S. Cl. .................... 477/203; 74/11; 477/73; 477/187

[58] Field of Search .................... 477/183, 187, 477/203, 205, 206, 207, 73; 74/11

[56] References Cited

U.S. PATENT DOCUMENTS

| | | | |
|---|---|---|---|
| 3,667,629 | 6/1972 | La Voie | 192/225 X |
| 4,253,437 | 3/1981 | Haramoto | 477/187 X |
| 5,611,751 | 3/1997 | Ehrenhardt et al. | 477/203 X |

*Primary Examiner*—Sherry L. Estremsky
*Attorney, Agent, or Firm*—Jeffrey P. Calfa; Dennis K. Sullivan

[57] ABSTRACT

A circuit interfaces the brake, the drivetrain, and an accessory driven from the engine through a power take-off with the engine control so as to disallow application of the brake from discontinuing running of the engine at running speed set by the throttle control input whenever there is concurrence of a first input selecting placement of the accessory device in driven relationship to the power shaft, of a second input distinguishing that the transmission is in non-neutral position, and of a third input indicating vehicle speed is below a certain limit. The circuit allows a driver of the vehicle to apply the brake and operate the accessory without interrupting the set running speed of the engine so long the vehicle speed is below the certain limit.

14 Claims, 3 Drawing Sheets

CIRCUIT FOR INTERFACING VEHICLE DRIVETRAIN, SERVICE BRAKE, AND POWER TAKE-OFF WITH ENGINE CONTROL

FIELD OF THE INVENTION

This invention relates generally to automotive vehicles that are powered by internal combustion engines and that have accessories which are driven through power take-offs from the engines. More particularly the invention relates to a circuit for interfacing a drivetrain, a service brake, and a power take-off of an engine-powered vehicle with an engine control for overriding a throttle control input to the engine control upon the concurrence of certain conditions. The invention is especially useful in, although not limited to, certain special purpose trucks.

BACKGROUND AND SUMMARY OF THE INVENTION

An automotive vehicle internal combustion engine has a flywheel attached to an end of a crankshaft. The flywheel is coupled to the vehicle's drivetrain to propel the vehicle. In certain vehicles, trucks for example, the engine powers not only the drivetrain and but also one or more special-purpose accessories. An example of such an accessory is a fluid power system that includes a hydraulic pump that is driven from the engine through a power take-off.

A power take-off, sometimes referred to as a PTO, is driven by the engine crankshaft, but the power take-off point is typically other than at the flywheel. In certain trucks the flywheel is at the rear of the engine and the PTO at the front. A truck chassis may provide a platform behind a truck cab. The truck may carry certain equipment on that platform, and such equipment may include fluid power equipment. A truck that collects and hauls certain types of waste, such as trash, may have a waste collection body mounted on its chassis behind the cab and containing fluid power equipment, such as a hydraulic powered ram for occasionally compacting the collected trash within a bin of the body. Such a ram may comprise one or more hydraulic cylinders that is or are coupled by a fluid power control system to a hydraulic pump that is driven from the engine through a PTO.

In certain trucks an engine throttle control input sets an engine control to run the engine at a desired engine speed within an engine speed range extending from engine idle speed. The engine control may be designed however such that occurrence of any of certain conditions of vehicle operation will act to override the throttle control input by discontinuing running of the engine at the set engine speed. Rather than shutting down the engine, such events result in the engine being throttled down toward idle speed. The engine can again be reset to run at a desired running speed once all events that would otherwise discontinue speed-set running have ceased. An event that may trigger discontinuance of engine running at a set engine speed is the application of a service brake for decelerating the vehicle.

In certain trucks, it may be desirable to disallow operation of an accessory that is driven through a PTO if the truck is being operated above a certain vehicle speed. However, when the vehicle's transmission is placed in a neutral gear, engine power is not needed to propel the vehicle, and in that case, operation of the accessory should not necessarily be disallowed.

The present invention relates to a circuit for interfacing a vehicle drivetrain, service brake, and power take-off with an engine control: that allows an engine throttle control input to run the engine at a set engine speed, provided that certain events calling for discontinuance of such running do not occur; that allows an accessory to be driven from the engine through a PTO when the vehicle transmission is in a non-neutral gear and the vehicle is being driven at a vehicle speed not exceeding a certain limit; that disallows application of a service brake of the vehicle from discontinuing running of the engine at set engine speed, provided that the vehicle is being driven at a vehicle speed below the desired limit; and that allows the accessory to be driven from the engine through the PTO without discontinuing running of the engine at set running speed when the transmission is in a neutral position.

One general aspect of the invention relates to an automotive vehicle comprising: a combustion engine having a power shaft for delivering torque both to a drivetrain, including a transmission, that propels the vehicle and to an accessory transported by the vehicle; an engine control for running the engine at an engine running speed set by a throttle control input; a brake for selectively decelerating the vehicle; and a circuit interfacing the brake, the drivetrain, and the accessory with the engine control. The circuit comprises a first input that is selectively operable to select between placement of the accessory in driven relationship to the power shaft and placement of the accessory in non-driven relationship to the power shaft, a second input that distinguishes between the transmission being in a neutral position and in a non-neutral position, a third input related to vehicle speed, and a fourth input for distinguishing between application and non-application of the brake. The circuit further comprises a first circuit device that is selectively operable to first and second operating conditions, a second circuit device that is selectively operable to first and second operating conditions, and a third circuit device that is selectively operable to first and second operating conditions. A first circuit connection places the operating condition of the first circuit device under control of the first input, a second circuit connection places the operating condition of the second circuit device under control of the second input, a third circuit connection places the operating condition of the third circuit device under control of the operating condition of the first circuit device, of the operating condition of the second circuit device, and of the third input, and a fourth circuit connection places the engine control under control of the third circuit device and of the fourth input for disallowing application of the brake from discontinuing running of the engine at running speed set by the throttle control input whenever there is concurrence of the first input selecting placement of the accessory device in driven relationship to the power shaft, of the second input distinguishing that the transmission is in non-neutral position, and of the third input indicating vehicle speed is below a certain limit.

Another general aspect of the invention relates to a circuit for interfacing the brake, the drivetrain, and the accessory with the engine control. The circuit comprises a first interface connection for receiving an input that distinguishes between placement of the accessory in driven relationship to the power shaft and placement of the accessory in non-driven relationship to the power shaft, a second interface connection for receiving an input that distinguishes between the transmission being in a neutral position and in a non-neutral position, a third interface connection for receiving an input related to vehicle speed, and a fourth interface connection for receiving an input that distinguishes between application and non-application of the brake. Still further the circuit comprises a first circuit device that is selectively operable to first and second operating conditions, a second circuit device that is selectively operable to first and second operating conditions, and a third circuit device that is selectively operable to first and second operating conditions. A first circuit connection places the operating condition of the first circuit device under control of the input received at the first interface connection, a second circuit connection places the operating condition of the second circuit device under control of the signal received at the second interface connection, a third circuit connection places the operating condition of the third circuit device under control of the operating condition of the first circuit device, of the operating condition of the second circuit device, and of the signal received at the third interface connection, and a fourth circuit connection places the engine control under control of the third circuit device and of the input received at the fourth interface connection so that when installed in the vehicle, the circuit will disallow application of the brake from discontinuing running of the engine at running speed set by the throttle control input whenever there is concurrence of the input at the first interface connection selecting placement of the accessory device in driven relationship to the power shaft, of the input at the second interface connection distinguishing that the transmission is in non-neutral position, and of the input at the third interface connection indicating vehicle speed is below a certain limit.

The foregoing, along with further aspects, features, and advantages of the invention, will be seen in this disclosure of a presently preferred embodiment of the invention depicting the best mode contemplated at this time for carrying out the invention. This specification includes drawings, now briefly described, followed by detailed description that will make reference to these drawings.

DESCRIPTION OF THE PREFERRED EMBODIMENT

Figure 1:
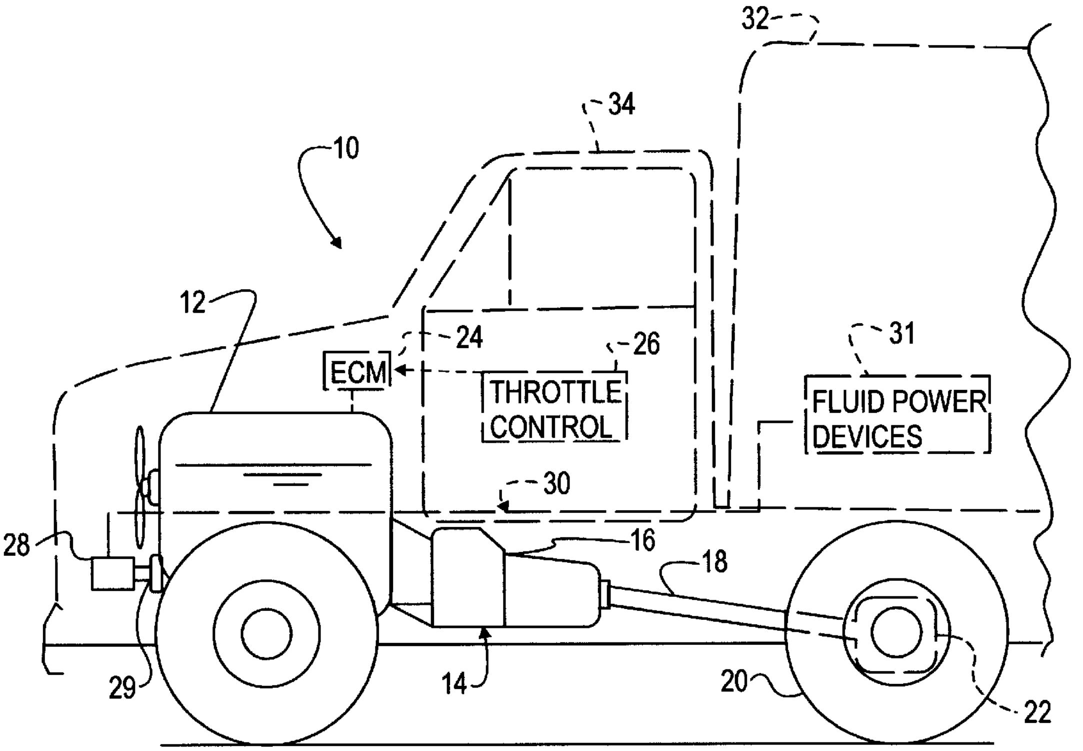
FIG. 1 is a side elevation view of an engine-powered vehicle embodying principles of the present invention.

FIG. 1 illustrates an automotive vehicle 10, a heavy truck for example, having a chassis containing a powertrain that includes an internal combustion engine 12, a diesel engine for example. Engine 12 has a crankshaft, including a flywheel, coupled to a drivetrain 14 through which engine 12 propels the vehicle. The drivetrain includes a multi-gear transmission 16 coupled to the engine flywheel either through a clutch in the case of a manually shifted transmission, or through a torque converter in the case of an automatic transmission. The transmission is coupled by a driveshaft 18 to driven wheels 20 of a rear axle assembly 22.

For propelling truck 10, engine 12 develops torque which is applied from the engine flywheel to drivetrain 14. Control of certain aspects of operation of engine 12 is performed by an electronic engine control, that may include an electronic control module, or ECM, 24. Functions controlled by ECM 24 may include the operation of individual fuel injectors for injecting diesel fuel into the engine cylinders in properly timed relation to engine operation to cause the engine to run at a desired engine speed that is set by a throttle control input 26.

One or more accessories may also be powered by torque developed by engine 12. FIG. 1 shows one accessory, a hydraulic pump 28 for example, that is driven by engine 12 through a power take-off, or PTO, 29 at the front of engine 12. A fluid power control system 30 couples pump 28 with one or more fluid power devices 31 carried by truck 10. If truck 10 is a waste collection and hauling vehicle that has a waste collection body 32 mounted on its chassis behind its cab 34, such devices may be fluid power cylinders that operate a ram for occasionally compacting collected trash in a bin of body 32.

Figure 2:
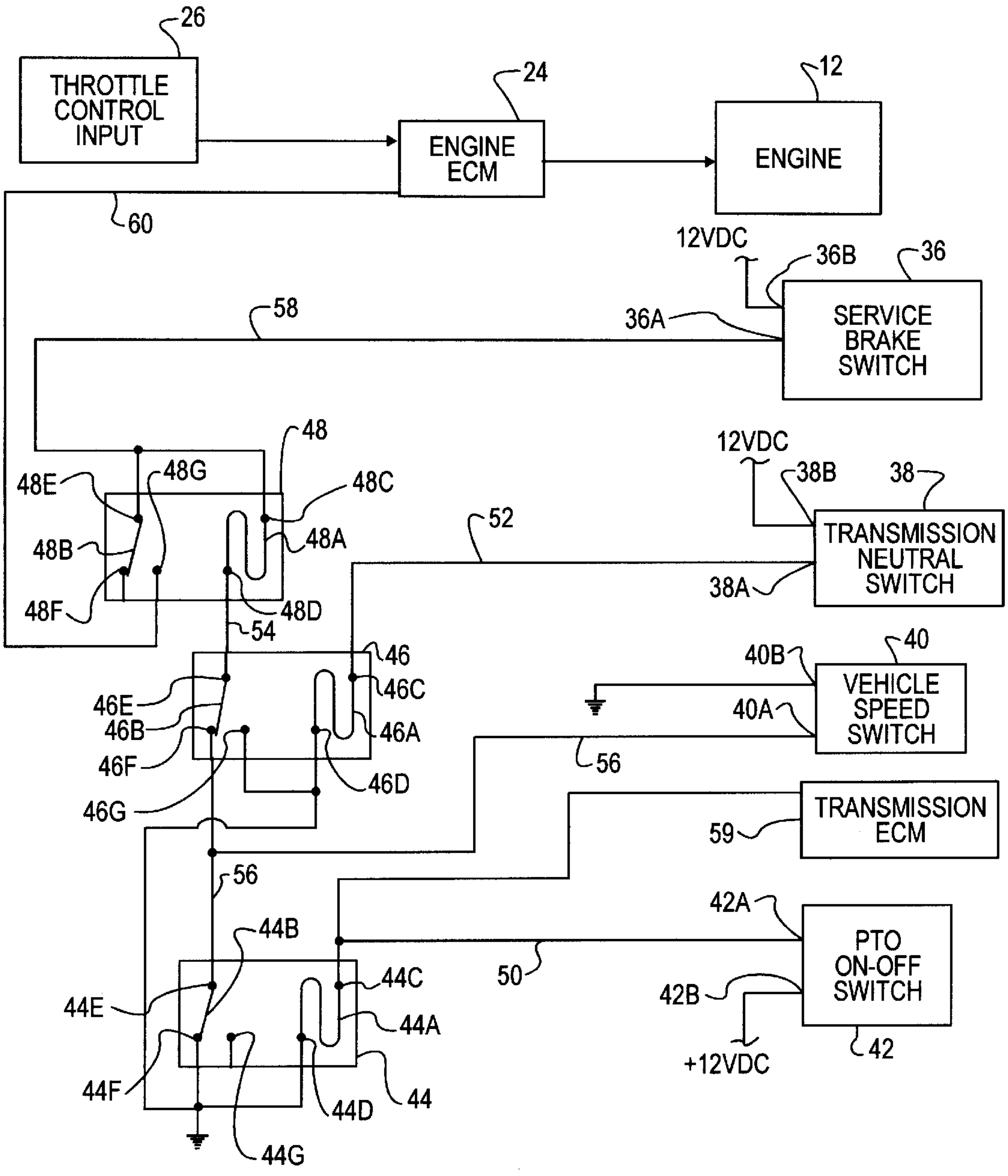
FIG. 2 is a general schematic diagram relating to a portion of the vehicle, including a circuit embodying principles of the present invention.

FIG. 2 discloses a circuit that interfaces certain inputs with the electronic engine control. These inputs comprise a service brake switch 36, a transmission neutral switch 38, a vehicle speed switch 40, and a PTO on-off switch 42. The circuit further comprises first, second, and third circuit devices 44, 46, and 48 respectively. Each device 44, 46, 48 is an electromechanical relay that comprises a respective coil 44A, 46A, 48A and a respective movable contact 44B, 46B, 48B. Each coil 44A, 46A, 48A is connected between respective pairs of terminals 44C, 44D; 46C, 46D; 48C, 48D. Each movable contact 44B, 46B, 48B is connected to a respective terminal 44E, 46E, 48E. When each coil 44A, 46A, 48A is not energized, its respective contact 44B, 46B, 48B provides continuity from its respective terminal 44E, 46E, 48E to a respective terminal 44F, 46F, 48F, and not to a respective terminal 44G, 46G, 48G. When each coil 44A, 46A, 48A is energized, its respective contact 44B, 46B, 48B provides continuity from its respective terminal 44E, 46E, 48E to a respective terminal 44G, 46G, 48G, and not to a respective terminal 44F, 46F, 48F. FIG. 2 illustrates a circuit condition wherein coils 44A, 46A, 48A are not energized. Terminal 44G is not connected because the normally open circuit portion of relay 44 is not used in the illustrated embodiment of interface circuit.

The circuit also comprises a first circuit connection for placing relay coil 44A under the control of PTO on-off switch 42, a second circuit connection for placing relay coil 46A under the control of transmission neutral switch 38, a third circuit connection for placing relay coil 48A under control of relays 44, 46, service brake switch 36, and vehicle speed switch 40, and a fourth circuit connection for associating relay contact 48B with service brake switch 36 and ECM 24.

The circuit connection for placing relay coil 44A under the control of PTO on-off switch 42 comprises a conductor 50 from a terminal 42A of switch 42 to terminal 44C, and the grounding of terminal 44D.

The circuit connection for placing relay coil 46A under the control of transmission neutral switch 38 comprises a conductor 52 from a terminal 38A of switch 38 to terminal 46C, and the grounding of terminal 46D.

The circuit connection for placing relay coil 48A under the control of relays 44 and 46, service brake switch 36, and vehicle speed switch 40 comprises a conductor 54 from terminal 48D to terminal 46E, a conductor 56 that connects terminal 46F, terminal 44E, and a terminal 40A of vehicle speed switch 40 in common, and a conductor 58 from terminal 48C to a terminal 36A of service brake switch 36. Contacts 44B and 46B are therefore in a series circuit between ground and terminal 48D. Switch 40 is in series circuit relationship with contact 46B and in parallel circuit relationship with contact 44B.

The circuit connection for associating relay contact 48B with service brake switch 36 and ECM 24 comprises conductor 58 connecting terminal 48E in common with terminals 36A and 48C and a further conductor 60 between terminal 48G and a terminal 24A of engine ECM 24.

Each of switches 36, 38, 40, and 42 comprises a second terminal 36B, 38B, 40B, and 42B respectively. Terminals 36B, 38B, and 42B are connected to the ungrounded side of the vehicle's electrical system supply voltage, +12 volts DC in this example. Terminal 40B is grounded. FIG. 2 incidentally shows that conductor 50 also serves to communicate PTO on-off switch 42 to an input terminal of a transmission ECM 59. Transmission ECM 59 monitors the condition of switch 42 but does not have any output terminal connected for interaction with the interface circuit of the present invention.

The circuit enjoys various modes of operation, which have been grouped in the following order solely for the purpose of explanation.

Transmission in a Drive Gear; PTO Switch in "Off"

This mode is independent of vehicle speed.

When PTO on-off switch 42 is operated "off", pump 28 is placed in non-driven relationship to the engine crankshaft, and relay coil 44A is not energized because that switch is open. When the vehicle transmission is operated to place driveshaft 18 in driven relationship to the engine crankshaft, relay coil 46A is not energized because transmission neutral switch 38 is open. As a consequence, terminal 48D of relay 48 is grounded through contacts 46B and 44B, making the energization or non-energization of relay coil 48A dependent on the condition of service brake switch 36. Service brake switch 36 is open when the service brake is not being applied, but closes when the service brake is applied to decelerate the vehicle. As long as switch 36 is open, relay coil 48A cannot be energized, and so the circuit through contact 48B to engine ECM 24 remains open.

Whenever the service brake is applied, switch 36 closes, causing relay coil 48A to be energized. This operates contact 48B to close the circuit from service brake switch 36 to engine ECM 24, causing a positive voltage signal to be input to ECM 24. ECM 24 responds by discontinuing running of the engine at running speed set by throttle control input 26.

The engine can be reset to a desired running speed set by throttle control input 26 after the service brake application ceases.

Transmission in a Drive Gear, PTO Switch in "On"

With PTO on-off switch 42 in "on" position, relay coil 44A is energized. This operates contact 44B to open the path to ground through terminals 44E and 44F. With driveshaft 18 in driven relationship to the engine crankshaft, transmission neutral switch 38 is open, causing relay coil 46A to not be energized. The only way to enable relay coil 48A to be energized is by applying ground through vehicle speed switch 40 and contact 46B to terminal 48D. Whether ground can be so applied depends on vehicle speed.

Switch 40 is open below a certain vehicle speed limit and closed above that limit. Hence, when vehicle speed is below the limit, which may be 20 miles per hour by way of example, relay coil 48A is enabled to be energized, and when vehicle speed is above the limit, relay coil is not enabled to be energized. Consequently, when vehicle speed is above the limit, service brake switch 36 controls the energization of coil 48A so that whenever the service brake is applied, switch 36 closes, causing relay coil 48A to be energized. This operates contact 48B to close the circuit from service brake switch 36 to engine ECM 24, causing a positive voltage signal to be input to ECM 24. ECM 24 responds by discontinuing running of the engine at running speed set by throttle control input 26. The engine can be reset to a desired running speed set by throttle control input 26 after the service brake application ceases.

When vehicle speed is below the limit, coil 48A cannot be energized, and so the service brake may be applied without effecting the running of engine 12 at the running speed set by throttle control input 26.

Transmission Out of Gear

This mode is independent of vehicle speed and of the position of PTO on-off switch 42.

When the vehicle transmission is operated to place driveshaft 18 in non-driven relationship to the engine crankshaft, transmission neutral switch 38 is closed, causing relay coil 46A to be energized. As a consequence, contact 46B operates to complete a circuit from terminal 48D to ground. Relay coil 46A will remain energized in this way regardless of the positions of switches 40 and 42.

As long as service brake switch 36 is open, relay coil 48A cannot be energized, and so the circuit through contact 48B to engine ECM 24 remains open. Whenever the service brake is applied, switch 36 closes, causing relay coil 48A to be energized. This operates contact 48B to close the circuit from service brake switch 36 to engine ECM 24, causing a positive voltage signal to be input to ECM 24. ECM 24 responds by discontinuing running of the engine at running speed set by throttle control input 26. The engine can be reset to a desired running speed set by throttle control input 26 after the service brake application ceases.

Because the transmission is in neutral rather than in gear, this represents a condition that may occur when truck 10 is stopped. If engine 12 is running, it may be set to a desired running speed by the engine control, and PTO 29 may be engaged to operate pump 28 by turning switch 42 "on", provided that the service brake is not applied. Application of the service brake will cause ECM 24 to discontinue running the engine at running speed set by throttle control input 26, even though the vehicle may not be in motion. When application of the service brake terminates, the engine may once again be run at a set running speed.

Figure 3:
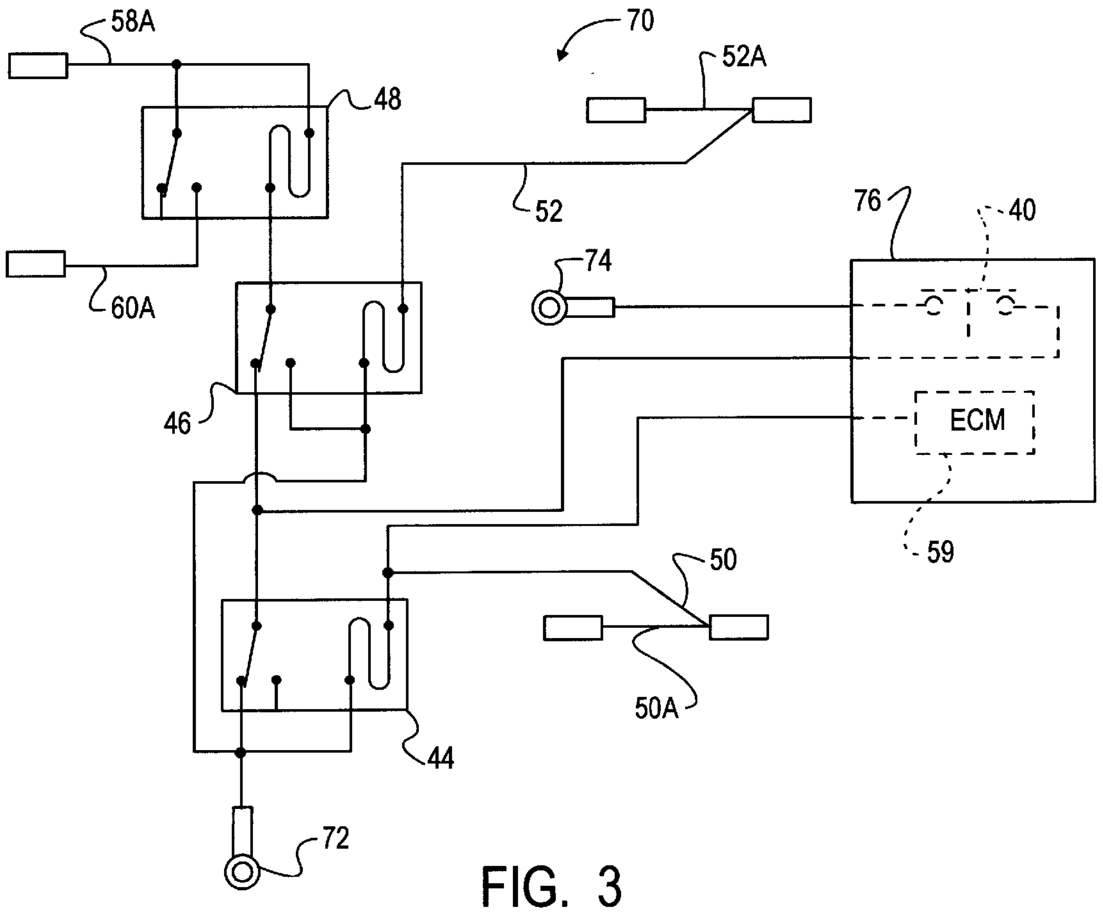
FIG. 3 is a schematic diagram of an adapter circuit that can be used to modify a pre-existing vehicle to incorporate principles of the present invention in such a vehicle.

FIG. 3 discloses an adapter 70 that may be used to adapt a pre-existing vehicle to a circuit configuration like that shown in FIG. 2. Components of adapter 70 that correspond to components of FIG. 2 are identified by the same reference number, and they will not be described again in the interest of brevity. The adapter comprises a splice 52A for interfacing the adapter with a pre-existing transmission neutral switch 38 by splicing conductor 52 into a pre-existing feed from the pre-existing transmission neutral switch 38, and a splice 50A for interfacing the adapter with a pre-existing PTO on-off switch 42 by splicing conductor 50 into a pre-existing feed from the pre-existing PTO on-off switch 42.

Further interfacing comprises severing a pre-existing feed from a pre-existing service brake switch 36, connecting a portion of the severed feed leading to switch 36, corresponding to conductor 58, to a conductor 58A of adapter 70, and connecting a portion of the severed feed leading to engine ECM 24, corresponding to conductor 60, to a conductor 60A of adapter 70. The adapter includes an eyelet 72 for making a ground connection of relays 44 and 46 as indicated, and interface connections to pre-existing terminal pins of a pre-existing electric wiring harness connector 76 in the vehicle to provide the connections indicated. The latter connections include an eyelet 74 for grounding of a terminal of a pre-existing speed switch 40, and respective connections to another terminal of the speed switch and to a pre-existing transmission ECM respectively. When installed in a vehicle, adapter 70 converts the pre-existing circuit to one like that shown in FIG. 2.

While a presently preferred embodiment of the invention has been illustrated and described, it should be appreciated that principles of the invention are applicable to all embodiments and uses that fall within the scope of the following claims.

What is claimed is:

1. An automotive vehicle comprising:

a combustion engine having a power shaft for delivering torque both to a drivetrain, including a transmission, that propels the vehicle and to an accessory transported by the vehicle;

an engine control for running the engine at an engine running speed set by a throttle control input;

a brake for selectively decelerating the vehicle; and a circuit interfacing the brake, the drivetrain, and the accessory with the engine control;

the circuit comprising a first input that is selectively operable to select between placement of the accessory in driven relationship to the power shaft and placement of the accessory in non-driven relationship to the power shaft, a second input that distinguishes between the transmission being in a neutral position and in a non-neutral position, a third input related to vehicle speed, a fourth input for distinguishing between application and non-application of the brake, a first circuit device that is selectively operable to first and second operating conditions, a second circuit device that is selectively operable to first and second operating conditions, a third circuit device that is selectively operable to first and second operating conditions, a first circuit connection placing the operating condition of the first circuit device under control of the first input, a second circuit connection placing the operating condition of the second circuit device under control of the second input, a third circuit connection placing the operating condition of the third circuit device under control of the operating condition of the first circuit device, the operating condition of the second circuit device, and the third input, and a fourth circuit connection placing the engine control under control of the third circuit device and the fourth input for disallowing application of the brake from discontinuing running of the engine at running speed set by the throttle control input whenever there is concurrence of the first input selecting placement of the accessory device in driven relationship to the power shaft, of the second input distinguishing that the transmission is in non-neutral position, and of the third input indicating vehicle speed is below a certain limit.

2. An automotive vehicle as set forth in claim 1 in which the accessory comprises a hydraulic pump that is power from the engine through a power take-off, and including a fluid power control system coupling the hydraulic pump in fluid control of one or more fluid-power-operated devices on the vehicle.

3. An automotive vehicle as set forth in claim 1 in which each of the first and second circuit devices comprises a respective controlled conduction path that is selectively operable to respective first and second conductivity conditions corresponding respectively to the first and the second operating conditions of the respective circuit device, and the third circuit connection comprises a series circuit connection of the controlled conduction paths of the first and second circuit devices.

4. An automotive vehicle as set forth in claim 3 in which the first and second circuit devices comprise respective first and second electromechanical relays having respective coils and respective contacts, and the controlled conduction paths of the first and second circuit devices include the respective contacts of the first and second relays.

5. An automotive vehicle as set forth in claim 4 in which the coil of the first relay is energized when the first input is selecting placement of the accessory in driven relationship to the power shaft, the coil of the second relay is energized when the second input distinguishes the transmission being in neutral position, and each contact opens the respective controlled conduction path when the respective coil is energized.

6. An automotive vehicle as set forth in claim 5 in which the third circuit device comprises a third electromechanical relay having a coil and a contact, the series circuit connection of the controlled conduction paths of the first and second circuit devices is connected in series with the coil of the third relay, and fourth circuit connection includes the contact of the third relay.

7. An automotive vehicle as set forth in claim 6 in which the fourth input comprises a switch that is open when the brake is not being applied and that is closed when the brake is being applied, and the switch is in series circuit relationship with the contact of the third relay.

8. An automotive vehicle as set forth in claim 5 in which the third input comprises a switch that is open when the vehicle speed is below a certain limit and that is closed when the vehicle speed is above the certain limit, and the third circuit connection places the switch in series circuit relationship with the contact of the second relay and in parallel circuit relationship with the contact of the first relay.

9. An automotive vehicle as set forth in claim 8 in which the third circuit device comprises a third electromechanical relay having a coil and a contact, the series circuit connection of the controlled conduction paths of the first and second circuit devices is connected in series with the coil of the third relay, and the fourth circuit connection includes the contact of the third relay.

10. An automotive vehicle as set forth in claim 9 in which the fourth input comprises a switch that is open when the brake is not being applied and that is closed when the brake is being applied, and the switch is in series circuit relationship with the contact of the third relay.

11. In an automotive vehicle having a combustion engine that has a power shaft for delivering torque both to a drivetrain, including a transmission, for propelling the vehicle and to an accessory transported by the vehicle, an engine control for running the engine at an engine running speed set by a throttle control input, and a brake for selectively decelerating the vehicle, a circuit for interfacing the brake, the drivetrain, and the accessory with the engine control, the circuit comprising:

a first interface connection for receiving an input that distinguishes between placement of the accessory in driven relationship to the power shaft and placement of the accessory in non-driven relationship to the power shaft, a second interface connection for receiving an input that distinguishes between the transmission being in a neutral position and in a non-neutral position, a third interface connection for receiving an input related to vehicle speed, a fourth interface connection for receiving an input that distinguishes between application and non-application of the brake, a first circuit device that is selectively operable to first and second operating conditions, a second circuit device that is selectively operable to first and second operating conditions, a third circuit device that is selectively operable to first and second operating conditions, a first circuit connection placing the operating condition of the first circuit device under control of the input received at the first interface connection, a second circuit connection placing the operating condition of the second circuit device under control of the signal received at the second interface connection, a third circuit connection placing the operating condition of the third circuit device under control of the operating condition of the first circuit device, the operating condition of the second circuit device, and the signal received at the third interface connection, and a fourth circuit connection placing the engine control under control of the third circuit device and the input received at the fourth interface connection so that when installed in the vehicle, the circuit will disallow application of the brake from discontinuing running of the engine at running speed set by the throttle control input whenever there is concurrence of the first input selecting placement of the accessory device in driven relationship to the power shaft, of the second input distinguishing that the transmission is in non-neutral position, and of the third input indicating vehicle speed is below a certain limit.

12. A circuit as set forth in claim 11 in which each of the first and second circuit devices comprises a respective controlled conduction path that is selectively operable to respective first and second conductivity conditions corresponding respectively to the first and the second operating conditions of the respective circuit device, and the third circuit connection comprises a series circuit connection of the controlled conduction paths of the first and second circuit devices.

13. A circuit as set forth in claim 12 in which the first and second circuit devices comprise respective first and second electromechanical relays having respective coils and respective contacts, and the controlled conduction paths of the first and second circuit devices include the respective contacts of the first and second relays.

14. A circuit as set forth in claim 13 in which the third circuit device comprises a third electromechanical relay having a coil and a contact, the series circuit connection of the controlled conduction paths of the first and second circuit devices is connected in series with the coil of the third relay, and the fourth circuit connection includes the contact of the third relay.

* * * * *